(12) United States Patent
Wang

(10) Patent No.: US 9,720,705 B2
(45) Date of Patent: Aug. 1, 2017

(54) SYSTEM AND METHOD OF DEMAND ORIENTED USER INTERFACE FRAMEWORK

(71) Applicant: SAP SE, Walldorf (DE)

(72) Inventor: Hanks Wang, Shanghai (CN)

(73) Assignee: SAP SE, Walldorf (DE)

( * ) Notice: Subject to any disclaimer, the term of this patent is extended or adjusted under 35 U.S.C. 154(b) by 719 days.

(21) Appl. No.: 14/261,898

(22) Filed: Apr. 25, 2014

(65) Prior Publication Data

US 2015/0309667 A1      Oct. 29, 2015

(51) Int. Cl.
*G06F 15/00*      (2006.01)
*G06F 13/00*      (2006.01)
*G06F 9/44*       (2006.01)

(52) U.S. Cl.
CPC ......... *G06F 9/4443* (2013.01); *G06F 9/4446* (2013.01)

(58) Field of Classification Search
CPC .................................. G06F 3/048; G06F 9/44
USPC ............... 715/856, 706, 781, 784, 740, 765
See application file for complete search history.

(56) References Cited

U.S. PATENT DOCUMENTS

| | | | |
|---|---|---|---|
| 7,607,137 B2 | 10/2009 | Hauser et al. | |
| 7,650,325 B2 | 1/2010 | Bader et al. | |
| 8,069,437 B2 | 11/2011 | Aigner et al. | |
| 8,155,696 B2 | 4/2012 | Swanburg et al. | |
| 8,316,386 B2 | 11/2012 | Kumar et al. | |
| 8,370,863 B2 | 2/2013 | Grigoriev et al. | |
| 8,533,213 B2 | 9/2013 | Yassin | |
| 8,589,374 B2 | 11/2013 | Chaudhri | |
| 2007/0016570 A1 | 1/2007 | Venkata et al. | |
| 2007/0174786 A1* | 7/2007 | Doi | G06F 3/0481 715/808 |
| 2010/0306191 A1 | 12/2010 | LeBeau et al. | |
| 2011/0137884 A1 | 6/2011 | Anantharajan et al. | |
| 2011/0153658 A1 | 6/2011 | Laird-McConnell | |
| 2011/0154231 A1 | 6/2011 | Cherdron et al. | |
| 2011/0208788 A1 | 8/2011 | Heller et al. | |
| 2013/0139271 A1 | 5/2013 | Arrelid et al. | |
| 2013/0219303 A1* | 8/2013 | Eriksson | G06F 3/1454 715/759 |

* cited by examiner

*Primary Examiner* — Kevin Nguyen
(74) *Attorney, Agent, or Firm* — Jones Day

(57) ABSTRACT

A system for Demand Oriented User Interface Framework may include a display screen displaying a user interface, a memory, an input, and a processor to detect information of a data item displaying in a window for an application program in the user interface. The processor, in response to the input detecting the information of the data item, may control the display screen to display one or more additional windows. The one or more additional windows may provide one or more functions outside of functionality for the application program to process the data item. The one or more functions may be ranked and displayed in the user interface for user selection.

20 Claims, 5 Drawing Sheets

100

200

300

400

500

SYSTEM AND METHOD OF DEMAND ORIENTED USER INTERFACE FRAMEWORK

BACKGROUND

The present disclosure generally relates to system with a user interface.

Typically, users may interact with computer application programs using graphical user interfaces (GUI). Users may easily use a PC without the need to understand the hundreds or thousands of computer code commands for performing even simple computer functions, such as copying a file.

However, integration between application programs, which could enhance user efficiency and user experience, has not developed significantly. Users are often forced to interact with individual computer application programs separately. For example, when a user is composing a document on a word processing application, he might encounter a term or a figure that he is not sure about the details or meanings. To perform a search, he might minimize the word processing application, move the mouse to launch a web browser, enter an internet search website, and then input a search term. After he obtains the search results, he might evaluate the results list, and return to the word processing application to continue composing the document. In this scenario, the user had to interact with multiple application programs separately, to access the different functions of different application programs on the computer system.

Thus, there is a need to increase the integration between application programs on the computer systems, to enhance user efficiency and the user experience.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

The present disclosure, through one or more of its various aspects, embodiments and/or specific features or sub-components, is thus intended to bring out one or more of the advantages as specifically noted below.

Figure 1:
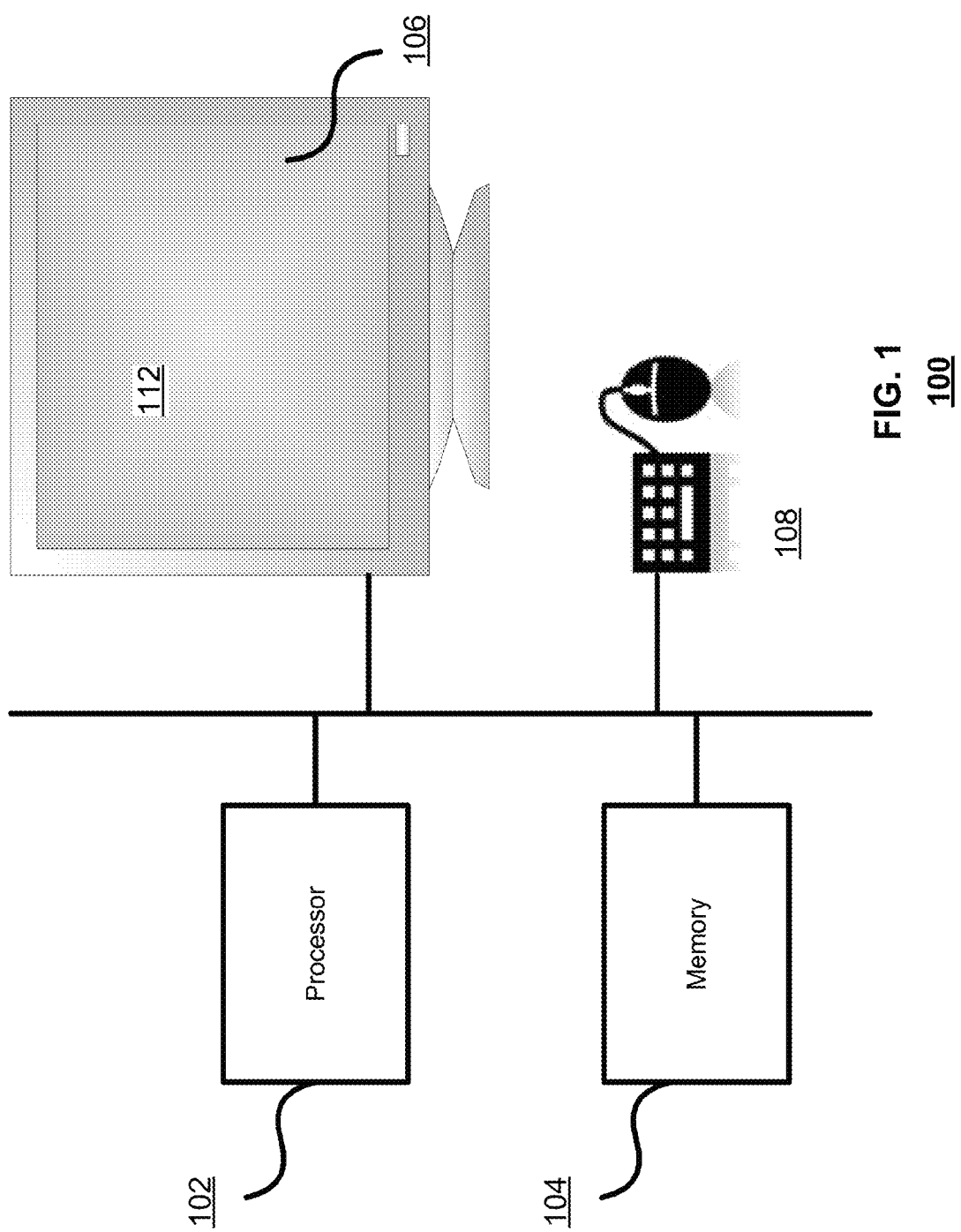
FIG. 1 illustrates an exemplary system with a user interface according an embodiment.

FIG. 1 is an exemplary electronic device with a user interface according an embodiment.

The electronic device 100 is generally shown and may include a processor 102, which is generally indicated. The processor 102 may include a Central Processing Unit (CPU) with one or more processing cores, and may be included within, any one or more computers, servers, systems, communication networks or cloud environment. The electronic device 100 may further include a memory 104, a display screen 106, and an input 108, which are connected to the processor 102. The electronic device 100 may further include other components, such as wired or wireless communication devices, global position satellite (GPS) unit. The electronic device 100 may be a mobile computing device, a mobile communication device, a desktop computer, or a server.

The memory 104 may include a static memory, a dynamic memory, or both. The memory 104 may additionally or alternatively include a hard disk, random access memory, a cache, a computer-readable medium storing instructions for execution in the electronic device 100, or any combination thereof. Of course, those skilled in the art appreciate that the memory 104 may comprise any combination of known memories or a single storage.

The display screen 106 may include, but is not limited to, a cathode ray tube (CRT), a liquid crystal display (LCD), a light projection display (LPD), a plasma display, a light emitting diode (LED) display. The display screen 106 may display a user interface 112. The user interface 112 may be a graphical user interface (GUI).

The input 108 may include, but is not limited to, a keyboard, a mouse, a touch sensitive surface, a pressure detector, a light detector, a video camera, a sonic detector, a microphone, a magnetic field detector, a stylus, and any other devices capable of receiving input data from users.

The electronic device 100, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that device. Further, while a single electronic device 100 is illustrated, additional embodiments may include any collection of systems or sub-systems that individually or jointly execute instructions or perform functions.

The electronic device 100 may be in communication with one or more additional computers in a network, which may be, but is not limited to, a local area network, a wide area network, the Internet, a telephony network, or any other network commonly known and understood in the art.

Of course, those skilled in the art appreciate that the above-listed components of the electronic device 100 are merely meant to be exemplary and are not intended to be exhaustive and/or inclusive. Furthermore, the examples of the components listed above are also meant to be exemplary and similarly are not meant to be exhaustive and/or inclusive.

The user interface 112 may be used by the user to interact with various application programs on the electronic device 100. The electronic device 100, along with processor 102 and other components, may be controlled to execute computer program instructions stored in a non-transitory computer readable medium, to implement a Demand Oriented User Interface (UI) framework according to an embodiment of this disclosure.

According to an embodiment, the display screen 106 may display the user interface 112. The input 108 may detect information of a data item displaying in a window for an application program (main program) in the user interface 112. The processor 102, in response to the input 108 detecting the information of the data item, may control the display screen 106 to display one or more additional windows, wherein the one or more additional windows provides one or more functions to process the data item that is not available in the window for the application program (main program).

The Demand Oriented UI (DOI) framework may include one or more programs or services executing in the background to provide the integration of various application programs available in the electronic device 100.

Figure 2:
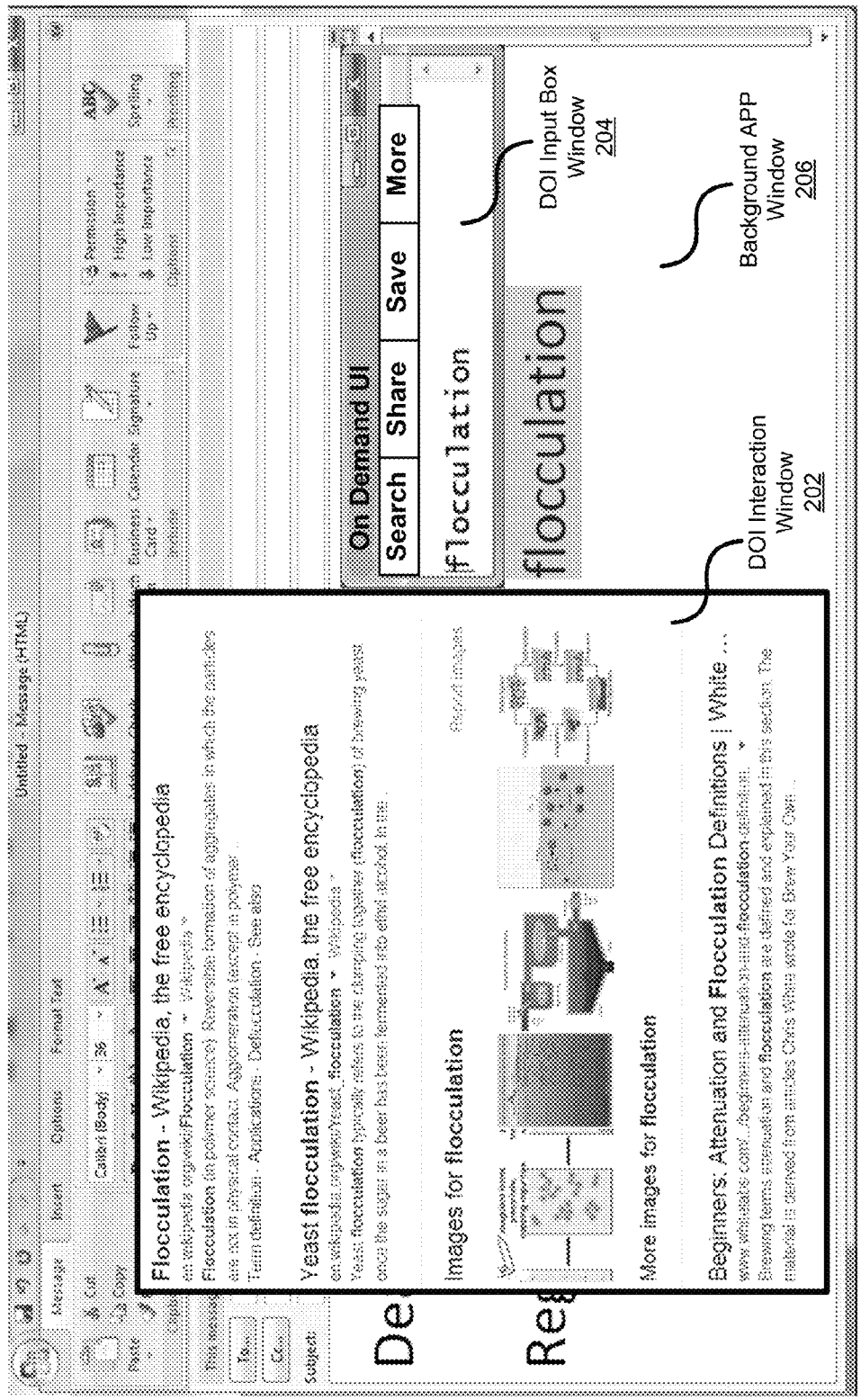
FIG. 2 illustrates an exemplary user interface according to an embodiment.

FIG. 2 illustrates an exemplary user interface according to an embodiment.

According to an embodiment, the user interface 200 may include a main application window (background application window) 206, and one or more DOI windows 202 and 204.

As illustrated in this example, the background application window 206 may be a window for composing an email document in an email application program. As the user is composing the email, he may input a word, such as "flocculation", into the email, which he wishes to access other application functions (maybe outside of the email programs). For example, he may wish to perform an internet search on the word "flocculation", to perhaps obtain a hyperlink to a website that can explain that word in more detail and to include that hyperlink in the email.

No matter which application is used, it is desirable to allow the users to interact with other applications. When an application program is operating, it is possible to activate or popup another window, triggered from the current focused window (main window of the application program). This popup window may receive the user's "thoughts" (at the specific moment), which may need to be processed by an application or a service. After the popup window is displayed, the focus is shifted from the main window to the popup window, and the user can directly type ideas in his mind to the input box without moving the mouse or any other action.

Alternatively, a data item, such as a word, a phrase, a hyperlink, or an image, from the main window that was highlighted, may be directly imported into the popup window as user's input, via for example, copy/paste functions.

In this example, the user may highlight the word "flocculation" in the email window (background application window) 206. The user may activate the DOI Input Box Window 204 as a popup window, by for example, hitting a set of "short-cut" keys or a sequence of keys on the input 108.

The DOI Input Box Window 204 may directly import the highlighted word "flocculation" from the background application window 206 into an input data field in the DOI Input Box Window 204. Alternatively, the DOI Input Box Window 204 may simply present a blank input data field for user to input, ignoring any data items highlighted in the background application window 206.

In the popup window, the DOI framework may analyze the user's input and may provide application function recommendations dynamically. The list of recommended application functions may be based upon all the functions available to all the application programs available in the electronic device 100, and the list may be ranked according to some preference or relevance ranking determined by a background algorithm in the DOI framework. Even if a desired application function is not ranked and displayed by a background algorithm, the user may still be able to access the desired application function by scrolling through the entire list of the recommended application functions, or the popup window may allow the user to manually browse for application functions or manually input command line commands to activate the desired application function. Alternatively, the user may simply type the some piece of application name in the input box, and the DOI framework may search for similar or matching application programs available in the electronic device 100.

Before or during when the popup window is prompted by triggering a shortcut, the DOI framework can obtain background application information block (from the background application window 206), which may contain Process ID, Application Name, Focus Window and ID, Focus Control type and ID, background resource type, etc. This information may be snapshotted as input to context detect algorithm of the DOI framework. Context detect will return one or more targeted applications or services which are best fitted to the context. The flagged applications will be weighed to display on the popup.

As one or more data items are imported or inputted into the input data field in the DOI Input Box Window 204, the DOI framework in the electronic device 100 may make recommendations on intelligent services/functions for access based on context information of the data items and the background application window 206. In this example, several recommended functions are given in the DOI Input Box Window 204, such as "search", "share", and "save" as higher ranked recommendations. An additional button, shown as "more", is presented to allow the user to access other lower ranked functions/services.

In this illustration, the recommended functions are shown on simple text captioned function buttons in the DOI Input Box Window 204. However, other visual representations of recommendations are possible, such as iconic or symbolic representations of the functions. Additionally, some functions may be available through multiple different application programs, for example, the "search" function may be available through several different available web browser programs. In such a case, it may be desirable to also present some recommendation information about the application program for the recommended functions, as well as ranking the application programs for the same recommended functions.

In this illustration, for example, if the user picks the "search" function by clicking on the "search" button in the DOI Input Box Window 204, then the DOI framework may activate the "search" function in a web browser program to perform an internet search on the data item, the word "flocculation". The result of that "search" may be presented in a DOI Interaction Window 202 as another popup window, which may not be shown before the "search" function is activated.

The user then may further interact with the DOI Interaction Window 202, which may retain all of the other functions of associated activated application program, here the web browser program associated with the DOI Interaction Window 202. The user thus may browse the search results, click on any of the hyperlinks to go to a website to obtain additional information. The user may additionally copy or save the additional information from the DOI Interaction Window 202.

After the user has completed all of the desired interactions with the DOI Interaction Window 202, the user may close the DOI windows 202 and 204, by for example, clicking on the "X" button on the DOI Input Box Window 204 to close one or more DOI windows 202 and 204. This would return the user back to (and refocus) the background application window 206 for the email program. The user may then continue composing email in the background application window 206. Additionally, the user may paste or load, into the email document in the background application window 206, saved information that he obtained from the DOI windows 202 and 204.

While the user was interacting with the DOI windows 202 and 204, the background application window 206 effectively lost focus and did not perform any interaction with the user. The DOI framework may be implemented in such a way to prevent the background application window 206 from accidentally becoming refocused and interacting with the user, to maintain a clean data item flow between various application programs, and to prevent the user from unintentionally activating multiple redundant application programs through the DOI framework.

The DOI framework's recommended function list may depend on the context information of the data items and the background application window 206 and the associated background application program, and may also additionally depend on software and parameters and information about the electronic device 100. For example, if the data item of user input is a word or a phrase, a plain input textbox, search, share and save applications will be prompted as default in the DOI Input Box Window 204. If the background application window 206 is for a social media program, then a "share" function may be listed in the DOI Input Box Window 204. If the data item is a long text string, the "save" function may be listed/adjusted as the first choice in the DOI Input Box Window 204.

Additionally, the DOI framework may detect the context information of the electronic device 100 itself, particular for mobile devices and mobile applications, to enhance integration of programs in mobile environment. For example, a user may open a chat program with a contact on a mobile electronic device 100. Upon triggering/activating the DOI framework, the DOI framework may detect the electronic device 100 as mobile, and may detect the GPS location of the electronic device 100 (or GPS location of the wife IP address connected to the electronic device 100). The user can attach the location information (or even an image of the map location near the user's location) in the chat message to the contact.

Additionally, accuracy of recommended applications and functions may be tracked and improved over time, by for example, keeping a log record of history of recommendations, context information, as well as user's choices, and performing heuristic analysis to determine a user's likely choices for a given set of context information. Also, the user (or system administrators) may implement sets of specific rules for specific context information to recommend sets of default applications and functions.

Furthermore, the DOI framework may be implemented such that multiple layers of DOI windows may provide the user with a sequence of functions, with the DOI Interaction Window 202 serving as another background application window for the next layer of DOI framework interaction. For example, a user may start with a background application window 206 of an email program, then may activate a "search" function via DOI framework. Then during browsing the search results, the user may wish to activate a social media program to discuss the search topic with a friend. This may effectively cause the DOI framework to make available to the user a string or a sequence of various functions and application programs, as desired by the user.

The DOI framework may let users utilize different kinds of services without interrupting their current workflow. This allows the users to capture ideas instantly. The DOI framework makes recommendations on intelligent services/functions for access based on the context of the user data at the instance of users' "idea conception". In particular, the DOI framework provides an open framework to allow application extensions to access cross-application functions from any specific application program.

On-Demand accessing application using the DOI framework, would not require users to locate a separate application, which means users can enter what he wants to do at a given time, activate additional functions not available in his current window application without a significant number steps.

Context and user's input cooperate together to intelligently recommend additional applications and functions using DOI framework algorithm. Accuracy of recommended applications and functions may be tracked and improved over time. The user can thus perform multiple desired functions from diverse number of application programs relevant to his tasks with the least number of steps, which is more natural and efficient for user to use.

DOI framework may further allow application registration. For example, when a new application program is installed on the electronic device 100, the new functions of the new application program may need to be registered into the DOI framework, to make the new functions available for user activation in DOI environment. When an application is considered to be integrated to DOI framework, the most important, essential, distinguisher features may be selected for integration into DOI framework, while other functions may be ignored.

Application extensions for application programs may be implemented to interface with the DOI framework. When an application extension is made for the DOI framework, only core functionality may be provided. For example, when a social media program company is considering to provide an extension for the DOI framework, perhaps only the "post" function/service is needed for the social media program extension.

In an exemplary extension, an interface register IDOI_APP_REG may be implemented, with the following exemplary METHODS.
  a) REG_APP_GENERAL_INFORMATION: provide application general information to DOI framework
  b) APP_START_UP_WIN: indicate the popup window which will override the default DOI popup
  c) APP_START_UP_CALLBACK: the logic put in this method will be called back when the popup is triggered.

When triggering DOI popup, the DOI framework may obtain the context information of the background application. Application name, and focus UI element name may be taken as context information input used for recommendation analysis.

An exemplary set of recommendation rules may include:
  a) Plain input textbox, search, share and save applications will be prompted as default. Based on user's configuration, detailed service type will be determined for each function.
  b) When background application can be categorized, for instance, user is on social network, the simplified popup will be triggered; in this case, only sharing popup will be displayed.
  c) During user's typing, input analysis will analysis the content of input to recommend dynamically. A simple scenario would be, after user input long text (length is greater than 200 words), save function would be the user's first choice.

The communication between the DOI framework and background applications may include two parts:

a) When prompting the popup window in DOI framework, the focus object can be accessed by DOI during runtime. Typically, a background image and selected text will be two common elements.

b) After the process is done by application extension in the DOI framework, some results may be required to be delivered to the background application. One case for this type of communication is after the user got the search results he wanted; he can directly insert the information to the document he is editing via for example copy/paste.

Figure 3:
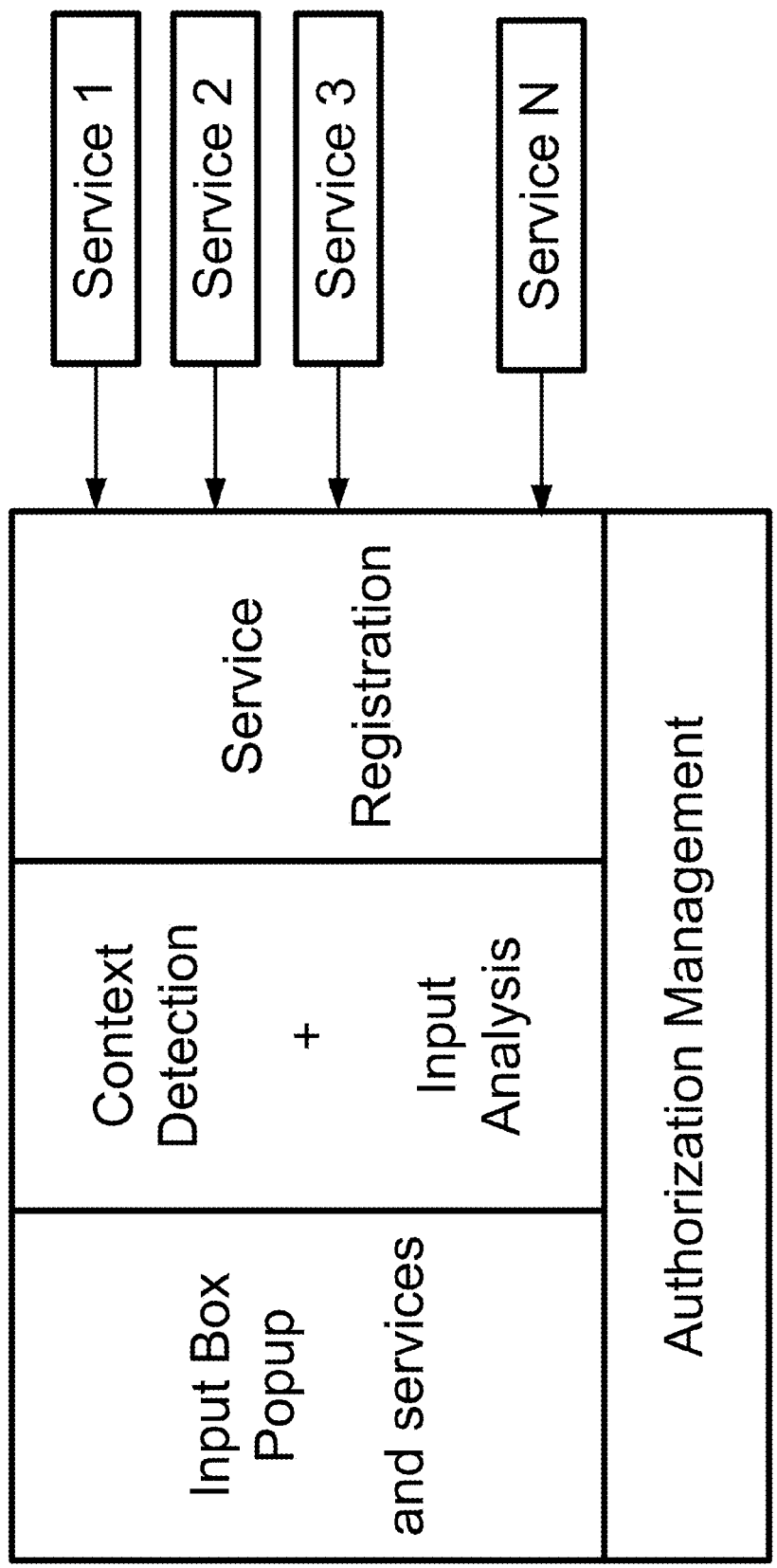
FIG. 3 illustrates an exemplary block diagram of the functions of a system according to an embodiment.

FIG. 3 illustrates an exemplary block diagram of the functions of a system according to an embodiment.

According to an embodiment, the DOI framework system 300 may include an input box popup and services block, a context detection and input analysis block, a service registration block, and an authorization management block. The DOI framework system 300 may have plurality of services 1-N (from various different application programs) made available and accessible through the DOI framework system 300.

The goal for authorization management block may be to provide unified and simplified sign-on function for different application extensions. As a general rule, the specified application extension may perform the individual authorization check respectively. But the authorization management block will manage service sign-on information centrally.

Application extension for each service/function may individually authorize DOI framework to access information. User may choose single sign-on, to remember any username and password for specific application programs, once the first authorization checking is passed. When sign-on service is activated, application extension which may be associated with such sign-on service may not need further checking in the future. Thus, such an application extension for a service is authorized.

Figure 4:
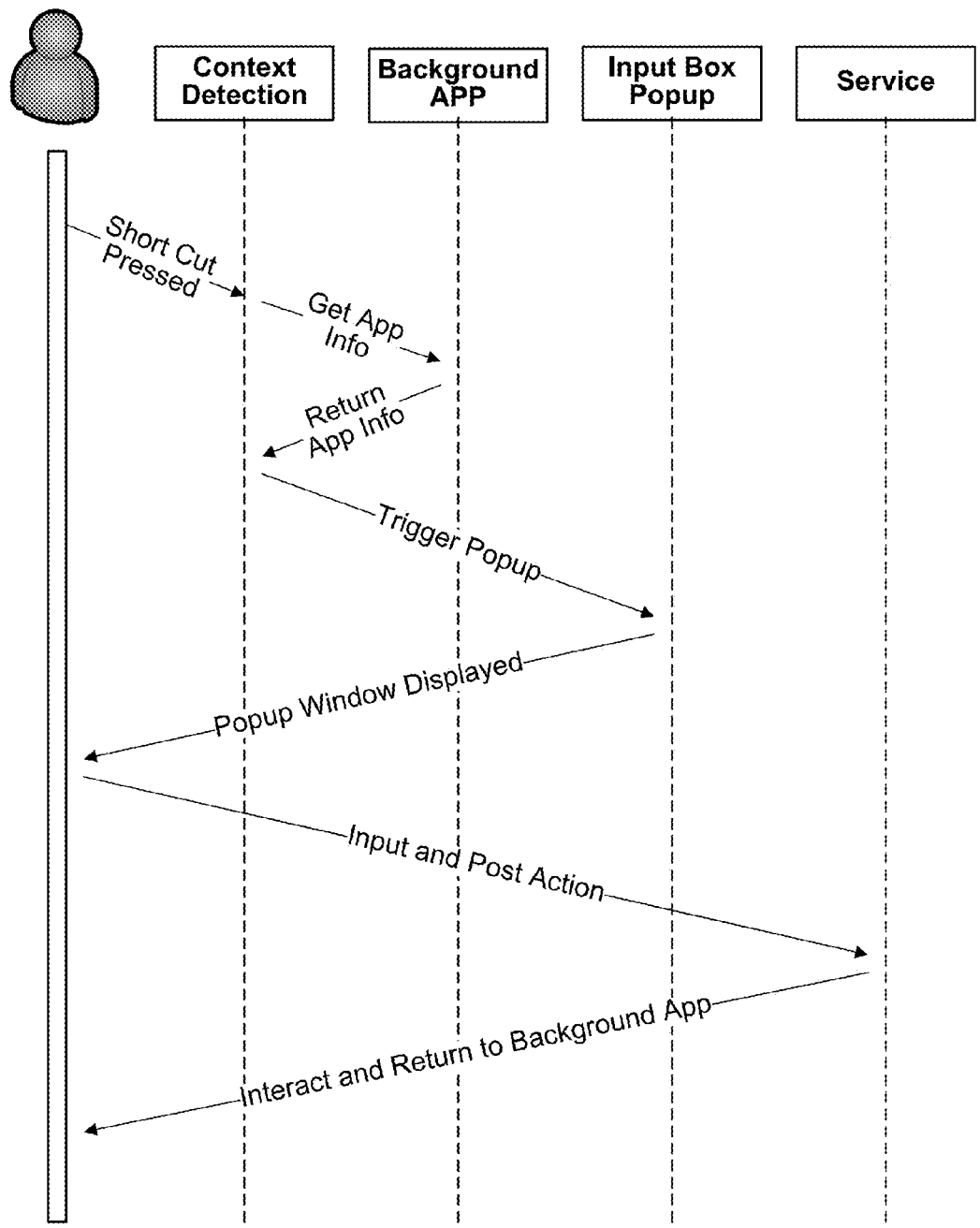
FIG. 4 illustrates an exemplary process according to an embodiment.

FIG. 4 illustrates an exemplary process according to an embodiment.

According to an embodiment of a process, a user may encounter one unfamiliar concept. The user may hit the shortcut for triggering the DOI framework to help him call search engine up.

The DOI framework may obtain the runtime background process block, the application name and ID, and current focus window and control.

This information is returned to the context detection block as input.

The context detection block processes the context information and generates a list of the recommended applications/services/functions. One or more DOI windows are triggered.

The recommended applications/services/functions are displayed in the DOI windows. Also the selected user data item is obtained and displayed in the input box.

The user may hit one of the recommended applications/services/functions, for example the "search" button, to perform additional functions not available in the background window The user may continue to interact with the DOI windows, and may eventually return to the background application.

Figure 5:
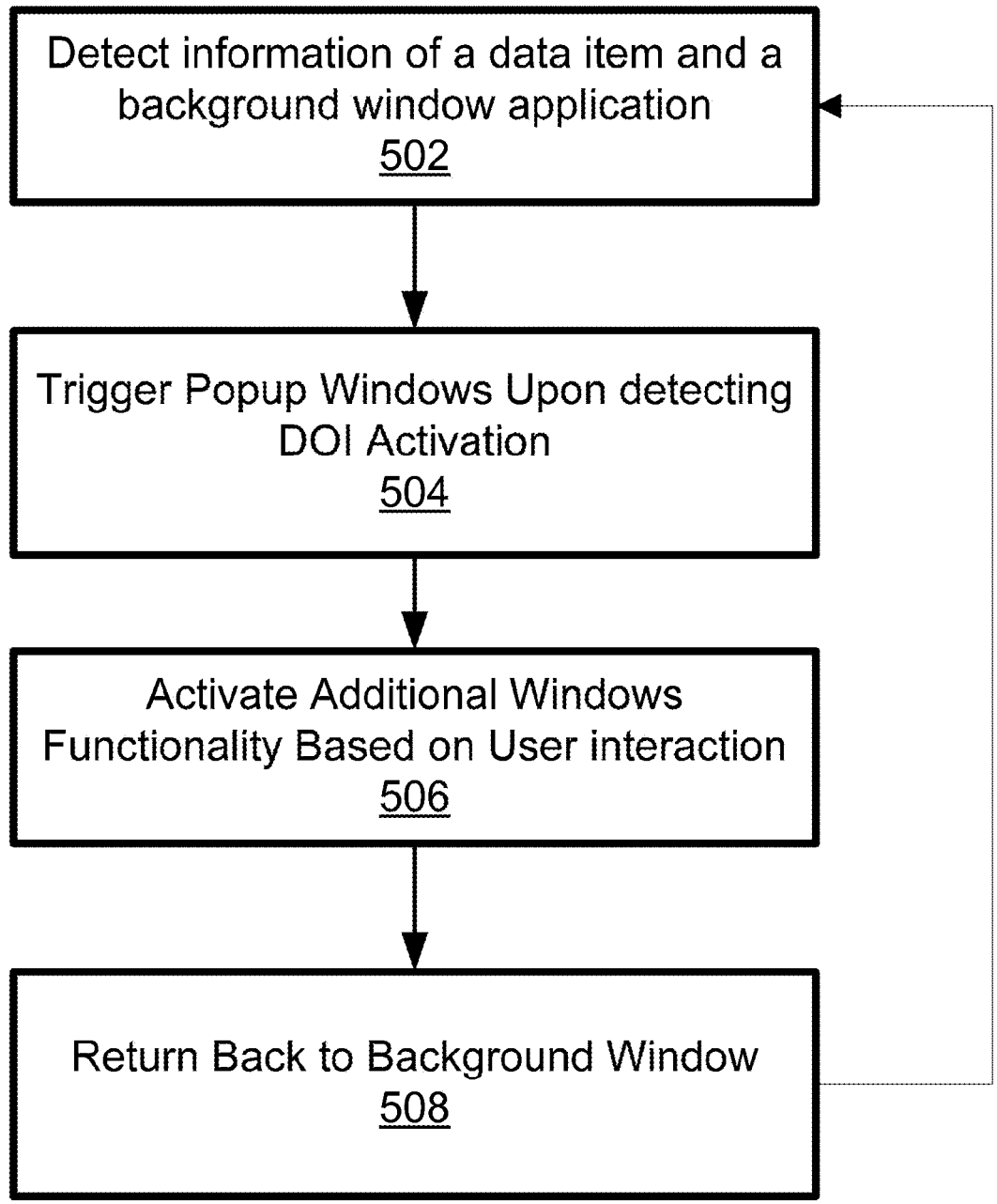
FIG. 5 illustrates an exemplary process according to an embodiment.

FIG. 5 illustrates an exemplary process according to an embodiment.

Process 500 starts at block 502, the input 108 may detect context information such as for data item and a background window application.

At block 504, popup DOI windows may be triggered upon detection of DOI activation.

At block 506, the additional popup DOI windows' functionalities may be activated based upon user interaction.

At block 508, after user interactions, the DOI framework may return the focus back to the background window.

According to an embodiment, a non-transitory computer readable medium may store computer program instructions executable by a processor in electronic device 100 to perform the various functions and implement the various features described above.

It is appreciated that the disclosure is not limited to the described embodiments, and that any number of scenarios and embodiments may exist.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

The present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "disclosure" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An electronic device, comprising:
    a display screen displaying a user interface;
    a memory;
    an input; and
    a processor detecting information of a data item displaying in a window for an application program in the user interface, wherein the processor, in response to detecting the information of the data item, obtaining context information associated with the window including runtime background process information, a name and an identification (ID) for the application program, a current focus for the window and a control in the window, controlling, based on the obtained context information, the display screen to display one or more additional windows and to automatically change the focus of the user interface from the window to the one or more additional windows, and wherein the one or more additional windows provides one or more functions outside of functionality for the application program to process the data item.

2. The electronic device of claim 1, wherein the information comprises at least one of a shortcut key, identification and type of the window for the application program, type of the data item, and size of the data item.

3. The electronic device of claim 1, wherein the information comprises hardware information of the electronic device.

4. The electronic device of claim 1, wherein the processor analyzes the information of the data item to generate a list of the one or more functions.

5. The electronic device of claim 4, wherein the processor analyzes the information of the data item by matching the information to a set of predefined rules.

6. The electronic device of claim 4, wherein the processor analyzes the information of the data item by performing heuristic analysis based on a history of the information of the data item.

7. The electronic device of claim 4, wherein the processor analyzes the information of the data item by performing heuristic analysis based on a history of user choices.

8. The electronic device of claim 1, wherein the processor analyzes the information of the data item to generate a list of the one or more functions based upon a plurality of available programs in the electronic device.

9. The electronic device of claim 1, wherein the processor analyzes the information of the data item to generate a list of the one or more functions based upon a plurality of available services registered via application extensions in the electronic device.

10. The electronic device of claim 9, wherein the electronic device stores usernames or passwords for at least one of the plurality of available services registered in the electronic device.

11. A computer-implemented method comprising:
    displaying, by a display screen of an electronic device, a user interface;
    detecting, by an processor and an input, information of a data item displaying in a window for an application program in the user interface;
    obtaining context information associated with the window including runtime background process information, a name and an identification (ID) for the application program, a current focus for the window and a control in the window; and
    controlling, by the processor based on the obtained context information, the display screen to display one or more additional windows and to automatically change the focus of the user interface from the window to the one or more additional windows, in response to detecting the information of the data item, wherein the one or more additional windows provides one or more functions outside of functionality for the application program to process the data item.

12. The method of claim 11, wherein the information comprises at least one of a shortcut key, identification and type of the window for the application program, type of the data item, and size of the data item.

13. The method of claim 11, wherein the information comprises hardware information of the electronic device.

14. The method of claim 11, wherein the processor analyzes the information of the data item to generate a list of the one or more functions.

15. The method of claim 14, wherein the processor analyzes the information of the data item by matching the information to a set of predefined rules.

16. The method of claim 14, wherein the processor analyzes the information of the data item by performing heuristic analysis based on a history of the information of the data item.

17. The method of claim 14, wherein the processor analyzes the information of the data item by performing heuristic analysis based on a history of user choices.

18. The method of claim 11, wherein the processor analyzes the information of the data item to generate a list of the one or more functions based upon a plurality of available programs in the electronic device.

19. The method of claim 11, wherein the processor analyzes the information of the data item to generate a list of the one or more functions based upon a plurality of available services registered via application extensions in the electronic device.

20. The method of claim 19, wherein the electronic device stores usernames or passwords for at least one of the plurality of available services registered in the electronic device.

* * * * *